United States Patent
Gabrielson

(10) Patent No.: US 10,860,363 B1
(45) Date of Patent: Dec. 8, 2020

(54) MANAGING VIRTUAL MACHINE HIBERNATION STATE INCOMPATIBILITY WITH UNDERLYING HOST CONFIGURATIONS

(71) Applicant: Amazon Technologies, Inc., Seattle, WA (US)

(72) Inventor: Jacob Gabrielson, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 90 days.

(21) Appl. No.: 16/353,940

(22) Filed: Mar. 14, 2019

(51) Int. Cl.
*G06F 9/455* (2018.01)
*G06F 9/4401* (2018.01)

(52) U.S. Cl.
CPC ........ *G06F 9/45558* (2013.01); *G06F 9/4401* (2013.01); *G06F 2009/4557* (2013.01); *G06F 2009/45562* (2013.01); *G06F 2009/45575* (2013.01)

(58) Field of Classification Search
CPC ............... G06F 9/45558; G06F 9/4401; G06F 2009/45562; G06F 2009/45575; G06F 2009/4557
See application file for complete search history.

(56) References Cited

U.S. PATENT DOCUMENTS

| | | | | |
|---|---|---|---|---|
| 9,223,596 | B1* | 12/2015 | Araujo | G06F 9/45558 |
| 2012/0084445 | A1* | 4/2012 | Brock | G06F 9/5077 709/226 |
| 2014/0053226 | A1* | 2/2014 | Fadida | H04L 67/34 726/1 |
| 2015/0040127 | A1* | 2/2015 | Dippenaar | G06F 9/5044 718/1 |
| 2015/0242229 | A1* | 8/2015 | van Riel | G06F 9/45545 718/1 |
| 2016/0062780 | A1* | 3/2016 | Young | G06F 9/45558 718/1 |
| 2016/0306651 | A1* | 10/2016 | Kripalani | G06F 8/65 |
| 2017/0039083 | A1* | 2/2017 | Kitano | G06F 9/485 |
| 2019/0121656 | A1* | 4/2019 | Hoppert | G06F 1/3287 |

* cited by examiner

*Primary Examiner* — Adam Lee
(74) *Attorney, Agent, or Firm* — Knobbe, Martens, Olson & Bear, LLP

(57) ABSTRACT

Systems and methods are described for managing virtual machine hibernation state incompatibility on hosted computing environments. Hibernated virtual machine instances may have limited compatibility with configurations of underlying host devices, such that attempting to awaken the virtual machine instance on a host device of a different configuration fails. This can be problematic, for example, as configurations of hosted computing devices change within an environment. The present disclosure addresses this issue by monitoring availability of a host device configuration, and, when the availability drops below a threshold, repairing the virtual machine hibernation state such that it is compatible with a new hosted device configuration.

22 Claims, 8 Drawing Sheets

MANAGING VIRTUAL MACHINE HIBERNATION STATE INCOMPATIBILITY WITH UNDERLYING HOST CONFIGURATIONS

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
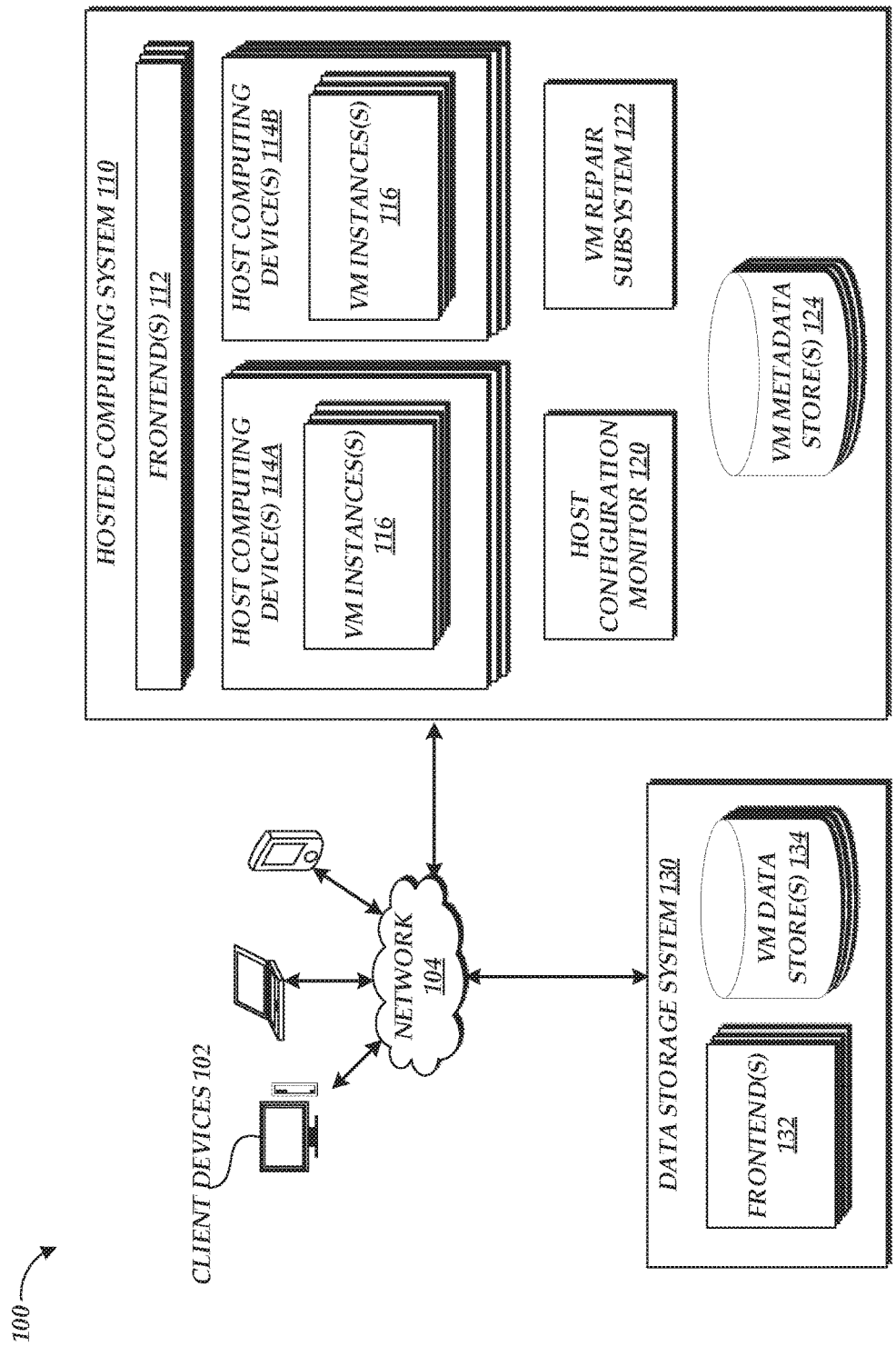
FIG. 1 is a block diagram depicting an illustrative environment in which a hosted computing environment can operate to repair hibernation state of a virtual machine instance incompatible with a configuration of a set of host devices.

Generally described, aspects of the present disclosure relate to handling hibernation of virtual machine instances on a hosted computing environment (sometimes referred to as a "cloud" computing environment). More specifically, aspects of the present disclosure relate to managing incompatibilities caused when hibernated virtual machines are awoken on a host device of a different configuration than the host device used during hibernation. Generally described, hibernation is a computing process whereby a running machine saves its state, such as contents of random access memory (RAM), to non-volatile storage, such as a hard disk, before powering off. The machine may later be "awoken" to resume that state. In the context of hosted computing environments, hibernation of a virtual machine instance generally entails saving hibernation data to a logical storage device, distinct from any individual host device used to host the instance. Moreover, because hosted computing environments are generally intended to be rapidly reconfigured (e.g., to host different virtual machine instances at any given time), there is typically no guarantee in such environments that the individual host device that hosted an instance prior to hibernation be the same as the host device which hosts the instance on awakening. If the pre- and post-hibernation host devices are substantially similar (e.g., sharing a hardware and software configuration), this change of host devices doesn't typically result in errors. However, in some instances, differences in the configuration of pre- and post-hibernation host devices can cause a virtual machine that is attempting to awaken from hibernation to fail under error. Because details as to the configuration of host devices are often hidden from end users of instances, these failures can be unpredictable and thus difficult to manage.

The present disclosure describes a mechanism for mitigating such incompatibility-related failures of virtual machine instances as they awaken from hibernation. Some implementations can involve monitoring a hosted computing environment for changes in the availability of host devices that are compatible with a hibernated virtual machine instance. When the availability of such devices falls below a threshold level, a hosted computing environment can utilize a remaining host device with a compatible configuration to awaken the virtual machine instance. The environment can then shut down the instance (as opposed to hibernating the instance). In general, shut down virtual machine instances are more resilient than hibernated instances to changes in hardware configuration, as an instance during start up may be configured to detect changes in configuration and account for those in operation of the instance. Thus, after shutting down the instance, the environment may then migrate the virtual machine instance (in the shut down state) to a host computing device with a different configuration (e.g., a higher-availability configuration, such as using updated hardware or software), and start the instance on that new host computing device. The environment may wait for the instance to complete the start up process (including, for example, execution of user scripts or the like that initialize the instance), and thereafter cause the instance to hibernate. Some implementations may wait for the instance to reach a similar state as the hibernated state before re-hibernating the instance (e.g., having a similar set of applications, scripts, or programs initialized or loaded into memory). As an end result, the hibernation state of the instance within its logical storage will change from a first hibernation state reflecting hibernation on a host device of a first, low availability configuration to a second hibernation state reflecting hibernation on a host device of a second, higher availability configuration. When an end user attempts to awaken the instance, the likelihood of error (or lack of availability of compatible host device) is therefore reduced.

In one embodiment, the logical storage of a virtual machine instance is stored within a network-storage location distinct from devices that can host the virtual machine instance. As the instance is migrated between hosts, the logical storage can be detached from the original host and then reattached to the new host, without requiring migration of the data stored within the logical storage. Since hibernation state is generally saved within logical storage, the techniques described herein can generally be expected to require minimal transfer of data within the hosted computing environment. Indeed, migration of a non-running virtual machine instance may simply require saving the machine's configuration (including, for example, an attachment to logical storage) on one host device, and recreating that configuration on another host device. Thus, embodiments of the present disclosure can be used to minimize errors or failures caused by incompatibility between a hibernated machine state and a new host device configuration while minimally impacting operation of the hosted computing environment.

The embodiments described herein may be particularly useful in scenarios where hibernation of virtual machines is used as a technique to avoid lengthy initialization times. For example, some software applications (and particularly resource intensive applications) can take significant time to load, which can introduce unwanted delays before end users can make use of their compute instances for their desired workloads. Similarly, scripting or other configurations may take significant amounts of time to run. As such, an end user may cause a virtual machine to start, await completion of its initialization phase (including, for example, any applications or scripting that the instance is configured to launch on start), and then hibernate the instance. The user may then awaken the instance at a later time to use the instance in its initialized state. However, should the instance fail to awaken (e.g., due to incompatibility of the hibernated state with a configuration of an underlying host device), the user might be forced to discard the hibernated state, or the instance may be rendered inaccessible. The techniques discussed herein avoid such a result, as incompatible hibernated state data can be replaced with compatible hibernated state data, increasing a likelihood that the instance is able to successfully resume operation in an initialized state.

As will be appreciated by one of skill in the art in light of the present disclosure, the embodiments disclosed herein improves the ability of computing systems, such as systems providing hosted computing environments, to support virtual machine instances in a hibernated state. Specifically, embodiments of the present disclosure reduce the likelihood of errors when attempting to awaken a hibernated instance, while facilitating changes to the configuration of host devices used within the environment. Moreover, the presently disclosed embodiments address technical problems inherent within computing systems; specifically, the limited ability of hibernated machines to appropriately handle changes in configuration of a host device when awakening from hibernation. These technical problems are addressed by the various technical solutions described herein, including the use of a host device of a first configuration to awaken and shut down a virtual machine, and the use of a host device of a second configuration to recreate hibernation data for the machine that is compatible with that second configuration. Thus, the present disclosure represents an improvement on existing data processing systems and computing systems in general.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which a hosted computing system 110 and data storage system 130 may operate based on communication with client devices 102.

By way of illustration, various example client devices 102 are shown in communication with the hosted computing system 110 and data storage system 130, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like.

The hosted computing system 110 illustratively corresponds to a system that enables client devices to create, provision, and access virtual machine ("VM") instances 118 hosted on host computing devices 114A and 114B. The system 110 includes one or more frontends 112 enabling client devices 102 to create, manage, and configure VM instances. The frontends 112 may illustratively implement "control plane" functionality with respect to VM instances. One example of a general hosted computing system that may be configured in accordance with the present disclosure is AMAZON's ELASTIC COMPUTE CLOUD™ (or "EC2™") system. The operation of a general hosted computing system to enable creation, configuration, and management of VM instances 116 on host devices is known in the art, and thus will not be described in detail herein.

To support operation of the VM instances 116, the environment 100 of FIG. 1 further includes a data storage system 130. The data storage system 130 illustratively includes one or more VM data stores 134, which store data pertaining to VM instances 116. The VM data stores 134 may correspond to any persistent or substantially persistent storage, such as hard disk drives (HDDs), solid state disk drives (SSDs), tape drives, or the like. Illustratively, the VM data stores 134 are partitioned into logical (e.g., virtualized) drives to be made available to VM instances 116. Thus, a first portion of a data store 134 may be presented to a first instance 116 as a first logical drive, a second portion of the store 134 may be presented to a second instance 116 as a second logical drive, etc. Each instance 116 may use its respective portion as a "local" drive, storing data such as an operating system for the instance 116. In accordance with traditional hibernation techniques, each instance 116 may therefore write hibernation data to its local drive, enabling the VM instance to be hibernated and shutdown on a first host computing device 114 and to be awakened on a second host computing device 114—assuming compatibility of the two devices 114 with respect to the hibernated VM instance 116.

The system 130 illustratively includes a frontend 132 to facilitate creation of, interaction with, and management of logical drives for VM instances 116. The frontend 132 may, for example, handle requests to create new logical drives for an instance 116 within the VM data stores 143, or requests to attach an existing drive to an instance 116.

As shown in FIG. 1, each virtual machine instance 116 is hosted by an underlying physical host computing device. In FIG. 1, two sets of host computing devices are shown: devices 114A and 114B. Host devices 114 within each set are, for the purposes of illustration, assumed to have identical or inter-compatible configurations with respect to awakening hibernated virtual machines. Thus, for example, a virtual machine entering hibernation state from one device of the set 114A can be assumed to be compatible (for purposes of waking from hibernation) with other devices of the set 114A. In contrast, devices of respective sets 114A and 114B are assumed, for purposes of illustration, to have incompatible configurations for purposes of waking a virtual machine instance from hibernation. The configurations may vary across device sets based, for example, on a change in the physical hardware included in the devices of the respective sets, a change in the software used by devices of the respective sets (e.g., a change in hypervisor version, patch state, configuration, or the like), or both. Thus, it is assumed for purposes of illustration that an instance 116 that suspends its state while hosted on a device of set 114A would fail if an attempt was made to make that instance 116 awaken on a device of set 114B.

To monitor the availability of host devices 114 of varying configurations, the system 110 of FIG. 1 includes a host configuration monitor 120. The host configuration monitor 120 illustratively corresponds to a computing device (which itself may be implemented as a VM instance 116) configured to monitor the availability of host computing devices with a given configuration. Illustratively, the host configuration monitor 120 may operate on a continuous or periodic basis to determine a configuration of each host computing device within the system 110, and for that configuration, monitor an availability of host computing devices over time. In one embodiment, configurations are determined by a "fingerprint" of a host device 114. Fingerprinting of host devices 114 is discussed in more detail in U.S. Pat. No. 9,928,099 entitled "Fingerprint-based Capacity Management of Physical Hosts" and issued Mar. 27, 2018 (the "'099 Patent"), the entirety of which is hereby incorporated by reference. As noted in the '099 Patent, a devices fingerprint may be determined by combining various hardware and/or software attributes of the device, such as via a hashing algorithm, to result in a fingerprint value that uniquely identifies that configuration. In some instances, multiple configurations may be monitored jointly. For example, where multiple configurations are determined to be intercompatible with respect to hibernating and awakening VM instances 116, those multiple configurations might be considered a single configuration for purposes of the present disclosure.

The availability of a configuration may illustratively reflect an absolute availability of host devices 114, a current usable availability of host devices 114, or both. For example, the absolute availability of a configuration may reflect a number of host devices 114 currently within the system 110, which number may vary as devices are taken in and out of service. The current usable availability of a configuration may reflect computing resources available on hosts device with that configuration (e.g., resources not currently used to support other VM instances 116). Whereas a low current usable availability may mean that a VM instance cannot be awakened from hibernation at the present moment, due to lack of sufficient capacity on an appropriate host device 114, low absolute availability may indicate that the VM will never be able to be awakened from hibernation, unless additional host devices 114 of an appropriate configuration are added to the system 110.

In FIG. 1, the host configuration monitor 120 is configured to monitor availability of the various configurations of host devices 114 on the system 110, to detect whether the availability of a configuration (or configurations) compatible with a hibernated VM instance 116 falls below a threshold level. As hibernated VM instances 116 are generally not executing on host computing devices, data regarding hibernated VM instance 116 may be stored within a VM metadata store 124 on the hosted computing system 110. The data stored within the VM metadata store 124 can include data such as which instances 116 have been hibernated to a logical drive on the system 130 and a configuration of a host device on which the instance 116 was hibernated. Like the VM data stores 134, VM metadata stores 124 may correspond to any persistent or substantially persistent storage, such as hard disk drives (HDDs), solid state disk drives (SSDs), tape drives, or the like.

As described herein, the host configuration monitor 120 may periodically or continuously obtain a listing of hibernated VM instance 116 from the metadata store 124, and determine whether availability of configurations compatible with each hibernated VM instance 116 has fallen below a threshold level. Configurations compatible with a hibernated VM instance 116 illustratively include a configuration on which the VM instance 116 was hibernated (as indicated, e.g., within the metadata for the instance 116), as well as other configurations previously determined to be compatible with that configuration.

In one embodiment, the threshold level for compatibility may be a fixed value, such as a number of compatible host computing devices currently usable and/or absolutely available on the system 110. Thus, if the number of currently usable and/or absolutely available on the system 110 falls below the fixed number, the host configuration monitor 120 may trigger a repair of the hibernated instance 116, as discussed below. In another embodiment, the threshold level for may be variable. Illustratively, the threshold level may vary based on a number of hibernated instances 116 sharing a given configuration (e.g., such that the threshold rises as the number of instances 116 potentially to be woken rises), a wake rate of instances 116 sharing a given configuration, or the like. As a further illustration, the threshold level may vary based on a change in availability of compatible configurations over time. For example, the threshold may be set such that a drop of n % in compatible configurations over a period of time (e.g., one day, one month, one year, etc.) triggers the threshold. In yet another embodiment, the threshold level may be a future availability. For example, the host configuration monitor 120 may apply forecasting techniques (a number of which are known in the art) to historical availability records to determine a predicted availability at a future time. The host configuration monitor 120 may set the threshold value based on the predicted future availability, such that if a currently predicted future availability drops below a given level, the threshold is satisfied.

If the number of host devices 114 with a configuration compatible to a virtual machine instance drops below the threshold level, it can be expected that a significant chance exists that, when an end users attempts to awaken a hibernated VM instance 116, a compatible host device 114 will be unavailable (either temporarily or permanently). As such, the host configuration monitor 120, on detecting such even, can request that the hibernated instance 116 be repaired by the VM repair subsystem 122.

Operation of the VM repair subsystem 122 is detailed below. However, in brief, the repair subsystem 122 is configured to "repair" a hibernated VM instance 116 for awakening on a host device 114 of a different (and incompatible from a hibernation perspective) configuration than the host device 114 on which the VM instance 116 was hibernated. Thus, by operation of the subsystem 122, a VM instance 116 hibernated on a host device 114 corresponding to a low-availability configuration may be enabled to awaken from hibernation on a host device 114 of a higher-availability configuration.

While the data storage system 130 and hosted computing system 110 are depicted in FIG. 1 as distinct, in some embodiments, these systems may be implemented as a single system.

The client devices 102, data storage service 130, and hosted computing system 110 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 2:
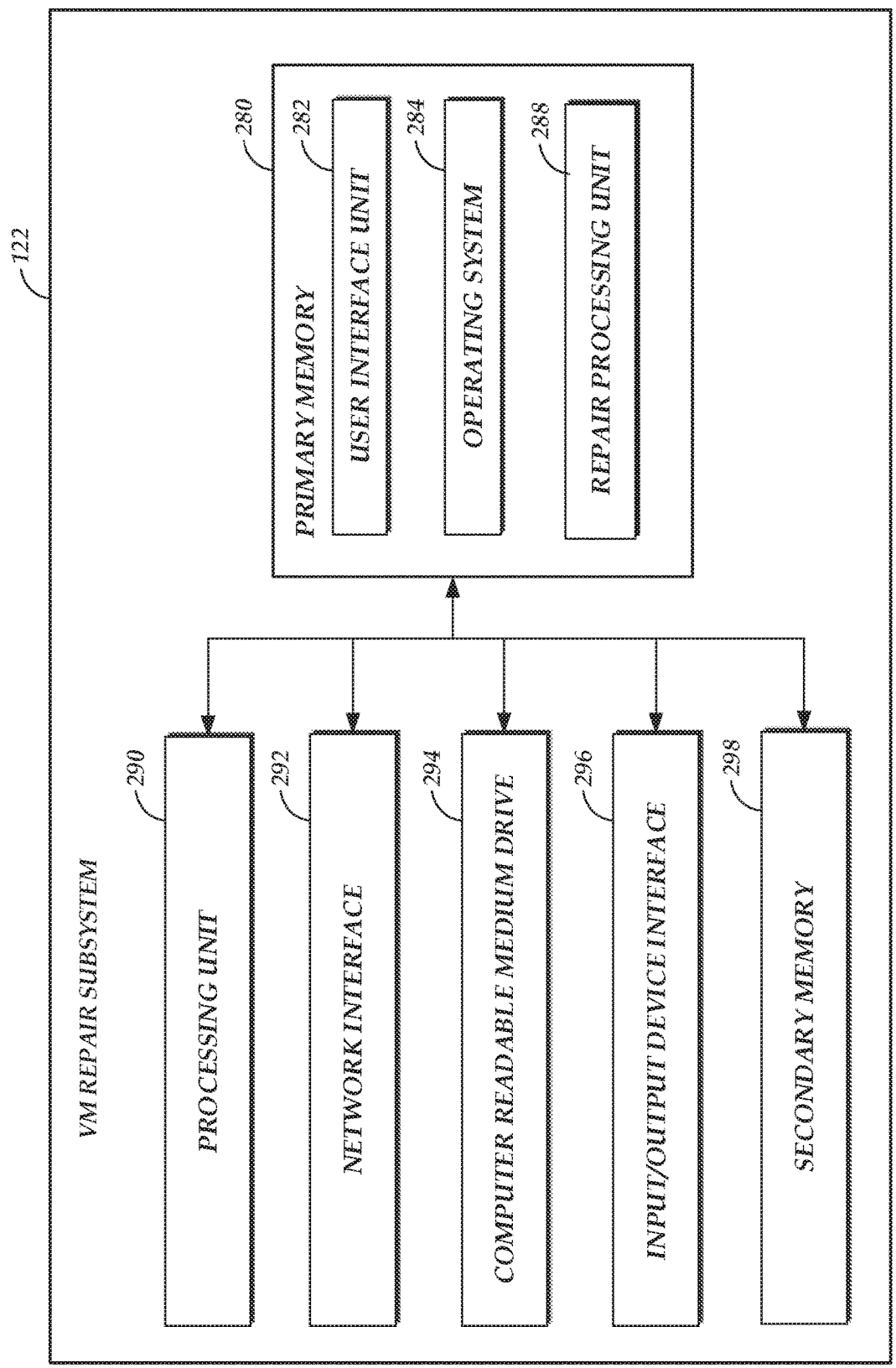
FIG. 2 depicts a general architecture of a computing device providing a VM repair subsystem of FIG. 1, which may function to repair virtual machine instance incompatible with a configuration of a set of host devices.

FIG. 2 depicts a general architecture of a computing system implementing a VM repair subsystem 122 of FIG. 1. The general architecture of the VM repair subsystem 122 depicted in FIG. 2 includes an arrangement of computer hardware and software that may be used to implement aspects of the present disclosure. The hardware may be implemented on physical electronic devices, as discussed in greater detail below. The VM repair subsystem 122 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1.

As illustrated, the VM repair subsystem 122 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from primary memory 280 and/or secondary memory 298 and further provide output information for an optional display (not shown) via the input/output device interface 296. The input/output device interface 296 may also accept input from an optional input device (not shown).

The primary memory 280 and/or secondary memory 298 may contain computer program instructions (grouped as units in some embodiments) that the processing unit 290 executes in order to implement one or more aspects of the present disclosure. These program instructions are shown in FIG. 2 as included within the primary memory 280, but may additionally or alternatively be stored within secondary memory 298. The primary memory 280 and secondary memory 298 correspond to one or more tiers of memory devices, including (but not limited to) RAM, 3D XPOINT memory, flash memory, magnetic storage, and the like. The primary memory 280 is assumed for the purposes of description to represent a main working memory of the worker manager 140, with a higher speed but lower total capacity than secondary memory 298.

The primary memory 280 may store an operating system 284 that provides computer program instructions for use by the processing unit 290 in the general administration and operation of the data manager 168. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device. In addition to and/or in combination with the user interface unit 282, the memory 280 may include a repair processing unit 288 executable to undertake the functionalities described herein with respect to the VM repair subsystem 122.

The VM repair subsystem 122 of FIG. 2 is one illustrative configuration of such a device, of which others are possible. For example, while shown as a single device, a VM repair subsystem 122 may in some embodiments be implemented as multiple physical host devices. In other embodiments, a single device may function to implement functionalities of both the VM repair subsystem 122 the host configuration monitor 120 (e.g., by including a configuration monitor unit within the memory 280 that is executable to carry out the functions of the host configuration monitor 120). Still a similar configuration to the device shown in FIG. 2 may be used as a host device 114, with the memory 280 of such a device storing virtual machine instances 116. In some embodiments, either or both of the VM repair subsystem 122 and the host configuration monitor 120 may be implemented as such an instance 116.

Figure 3:
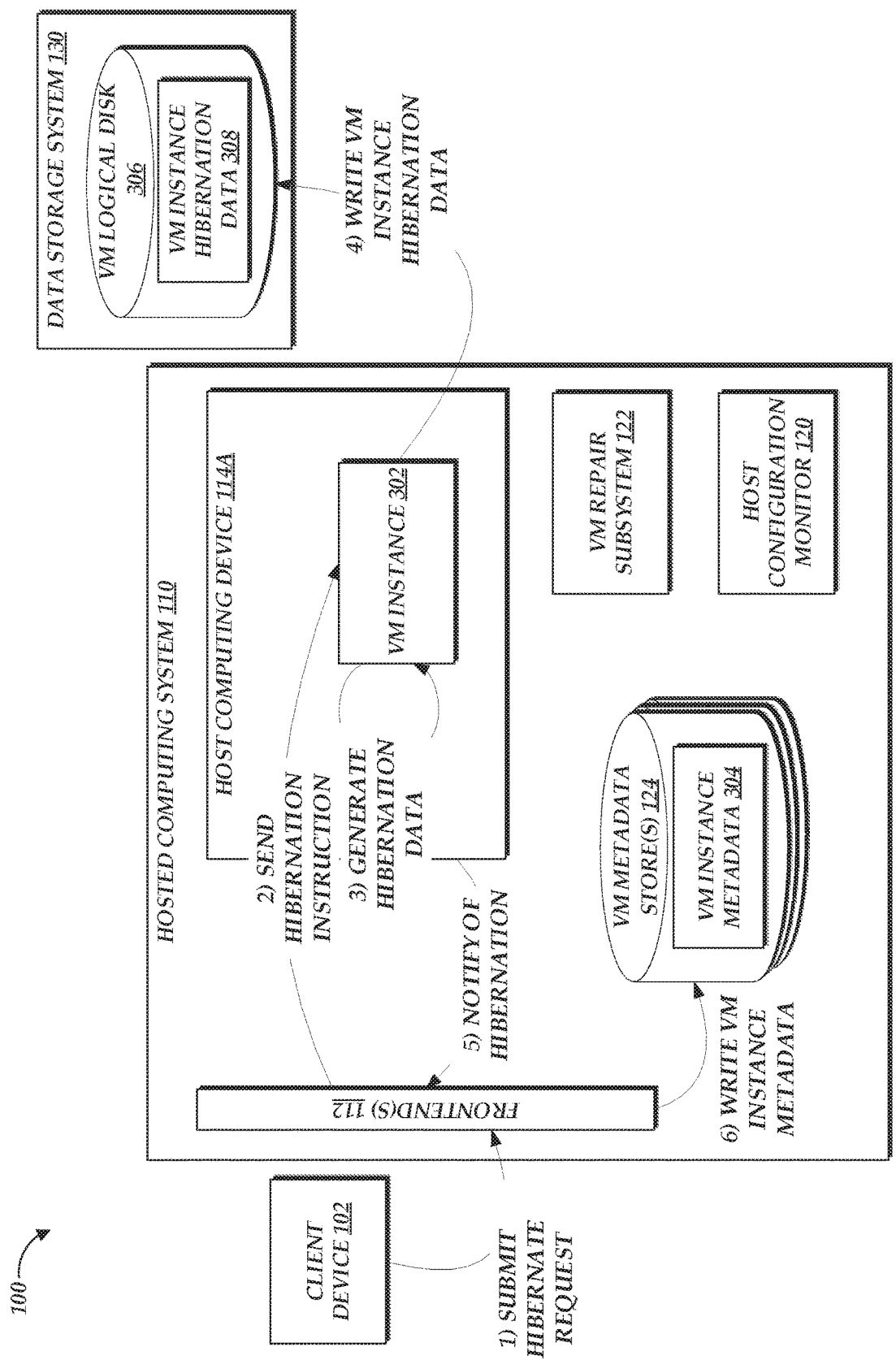
FIG. 3 is a flow diagram depicting illustrative interactions for hibernating a VM instance on the environment of FIG. 1.

With reference to FIG. 3, illustrative interactions are depicted for hibernating a VM instance 116, shown in FIG. 3 as instance 302, on the hosted computing system 110. The interactions begin at (1), where a client device 102 submits a request to the frontend 112 to hibernate the VM instance 302. Illustratively, the client device 102 may have previously created the VM instance 302, and caused the instance 302 to initialize to a ready state. The client device 102 may thus wish to hibernate the instance 302 to cease using resources associated with the instance 302 in a running state, while also maintaining the ability to rapidly awaken the instance 302 to an initialized state.

The instance 302 is illustratively operating on a host device of the set 114A, and shares a configuration with that set 114A. While the request is shown in FIG. 3 as stemming from a client device 102, in some instances the hosted computing system 110 may itself request an instance 116 be hibernated. For example, the system 110 may be configured to request hibernation of an instance 116 when availability of compute resources on the system 110 falls below a threshold level.

At (2), in response to the request, the frontend 112 sends to the instance 302 a hibernation instruction. The instruction may be in the form, for example, of an Advanced Configuration and Power Interface (ACPI) request to transition to a certain "sleep state," as those states are defined within the ACPI. For example, the instruction may instruct the instance 302 to transition to the "S4" ACPI power state (commonly known as "hibernation" or "suspend to disk"). In accordance with traditional hibernation, an operating system of the VM instance 302 responds to the instruction by generating hibernation data, such as a state of RAM, at (3), and writing that hibernation data to the instance's 302 disk drive. That disk drive is represented in FIG. 3 as VM logical disk 306, presented to the VM instance 302 as a local disk by the data storage system 130. Thus, after hibernation, the logical disk 306 includes VM instance hibernation data 308. In accordance with traditional hibernation, the VM instance 302 then "powers off."

Thereafter, the host computing device of the set 114A detects the power off (e.g., via operation of a hypervisor), and notifies the frontend 112 of successful hibernation, at (5). The frontend 112, in turn, writes to the VM metadata store 124 VM instance metadata 304 reflecting the hibernated state of the instance 302. The metadata 304 may include, for example, an indication that the instance 302 is hibernated to the logical disk 306, and a configuration of the host device of the set 114A (e.g., in the form of a fingerprint) from which the instance 302 was hibernated. The host computing device of the set 114A may additionally remove the VM instance 302 from that device, freeing resources for other operations.

Subsequent to the interactions of FIG. 3, a client device 102 may wish to awaken the hibernated instance 302. However, should the hosted computing system 110 vary the configurations of its host computing devices 114, such as by modifying the software or hardware of such devices in a way that makes the devices 114 incompatible with awakening the instance 302, it is possible that no appropriate device 114 would be available on which to awaken the instance 302.

Figure 4A:
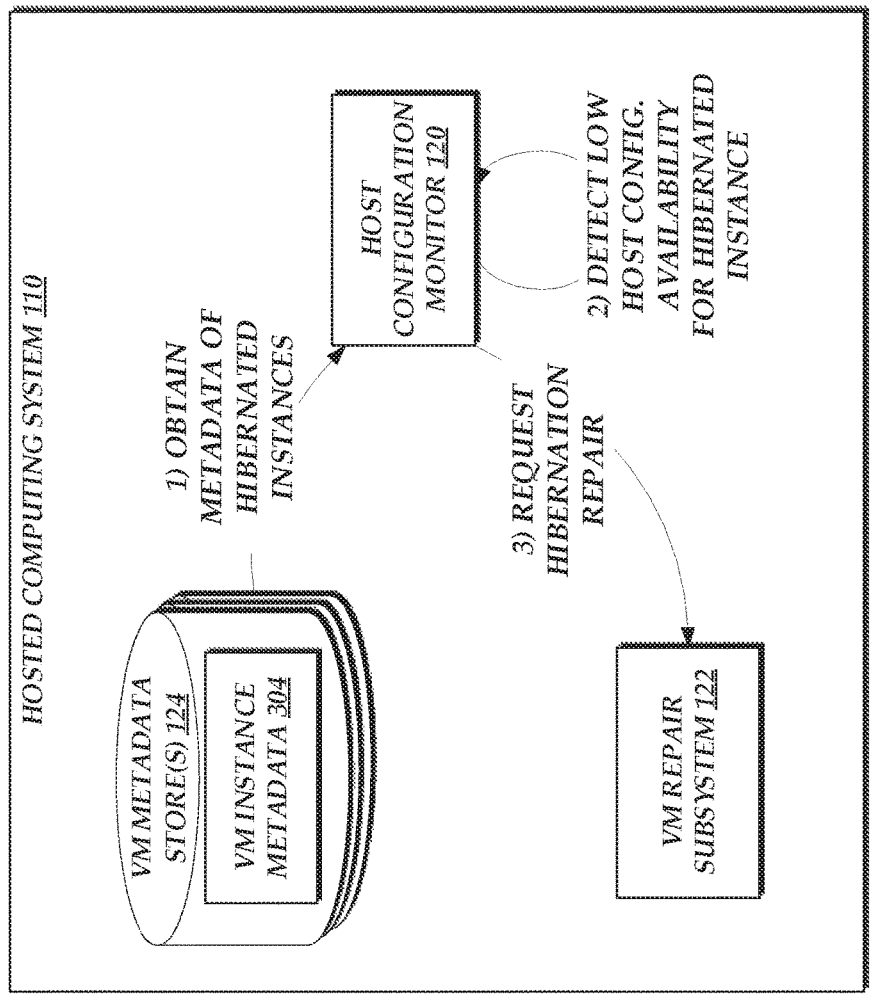
FIGS. 4A-4D depict illustrative interactions for repairing a virtual machine instance incompatible with a configuration of a set of host devices.
Figure 4B:
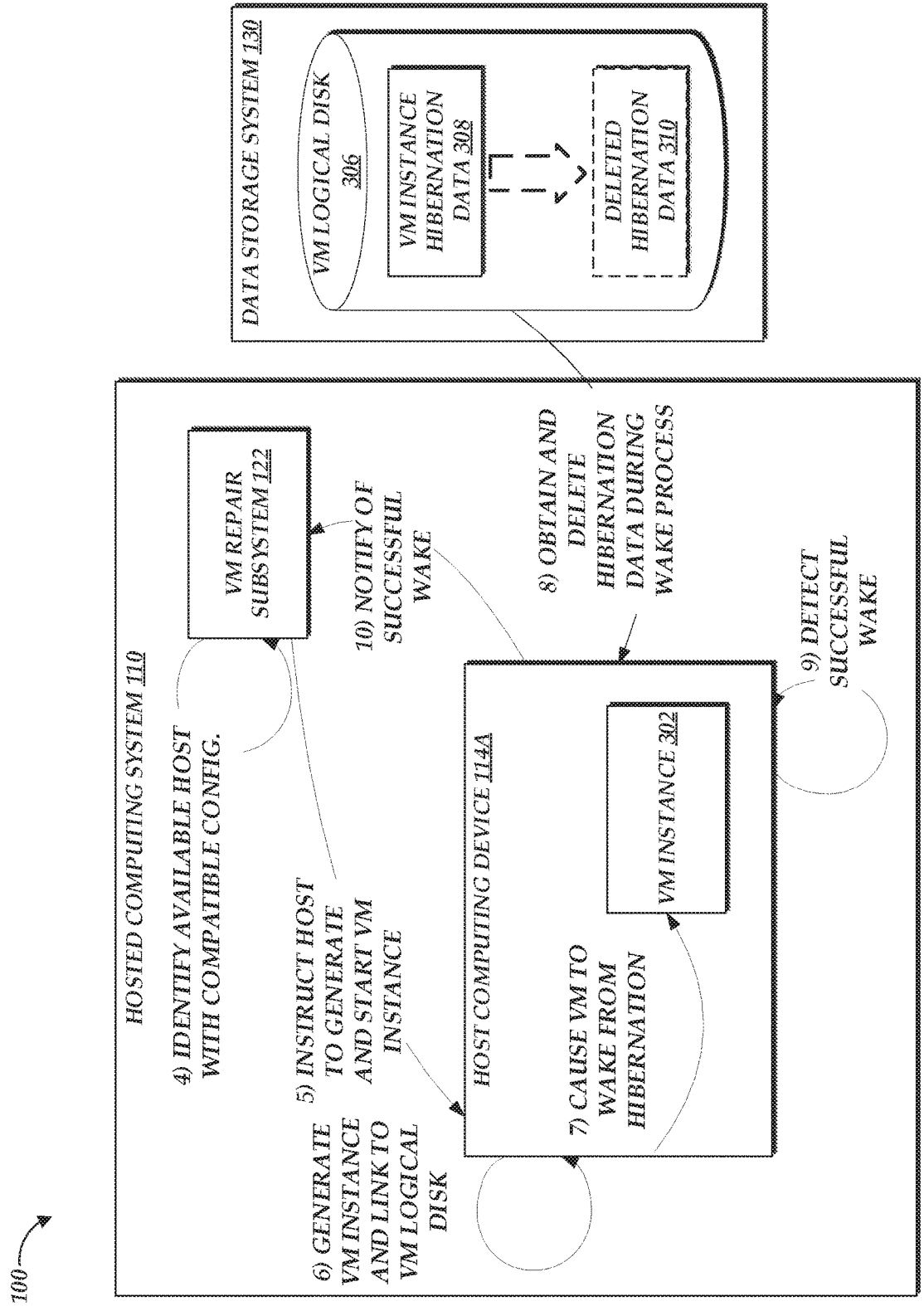
Figure 4C:
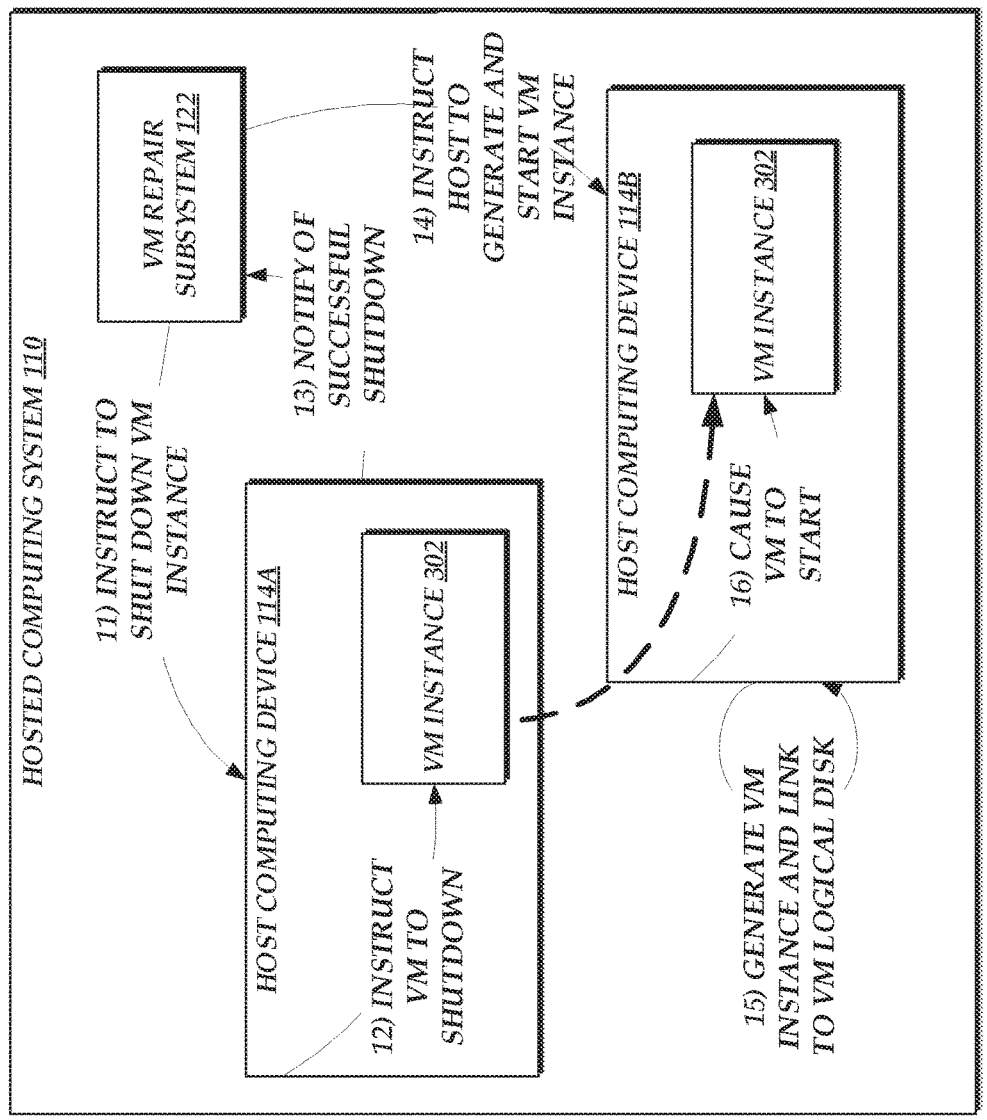
Figure 4D:
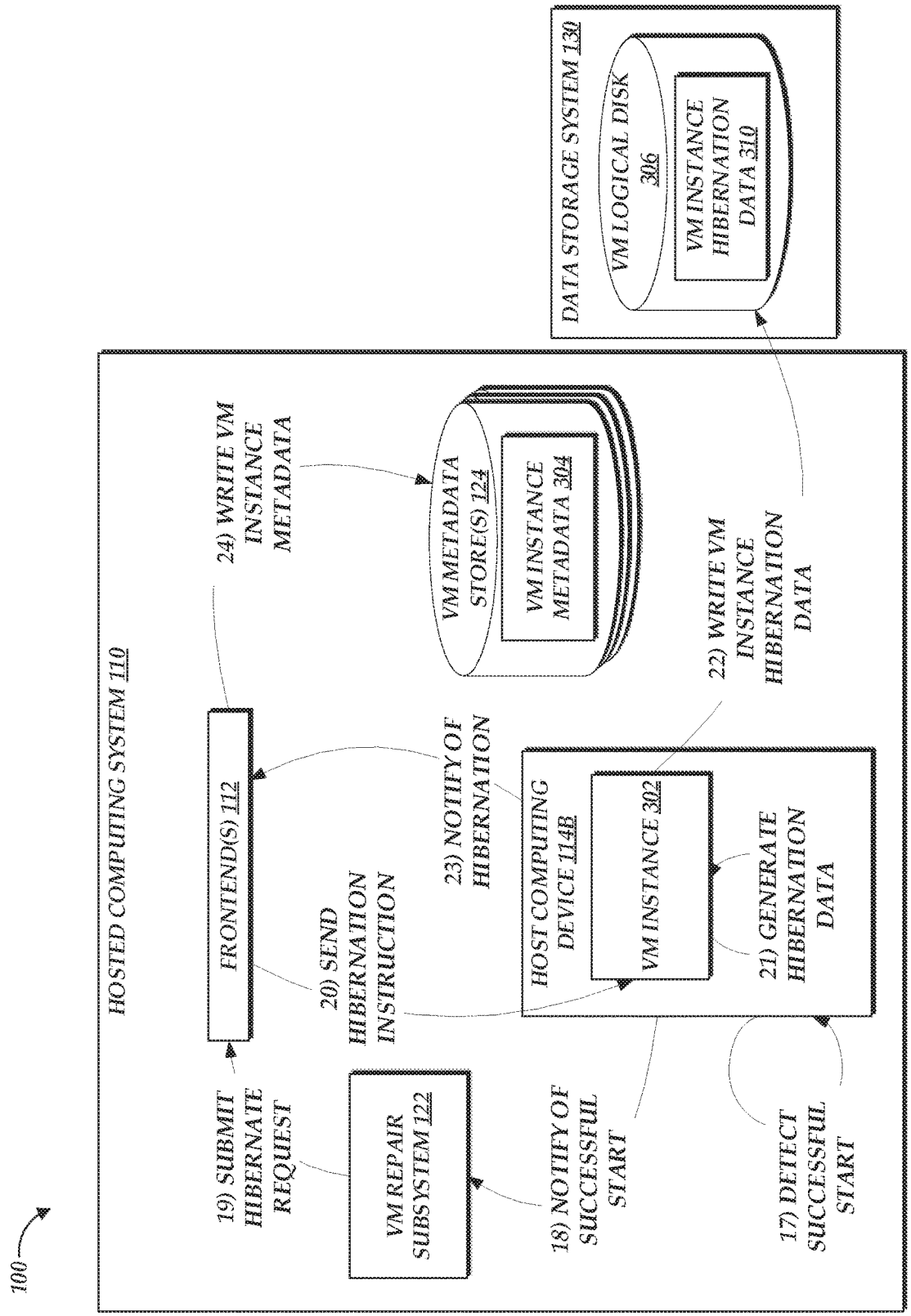

FIGS. 4A-4D depict interactions to address this potential issue, by "repairing" a hibernated instance 116 in a manner that changes the configuration of host devices 114 available on which to awaken the instance. Specifically, FIG. 4A depicts interactions for detecting, by the host configuration monitor 120 of FIG. 1, that an availability of the host computing devices 114 compatible with awakening the instance 302 (e.g., those of set 114A) has fallen below a threshold level, and for instructing the VM repair subsystem 122 to repair the instance 302. FIG. 4B depicts the VM repair subsystem 122 selecting a host computing device of the set 114A as compatible with the instance 302, and instructing the host device of the set 114A to awaken the instance 302. FIG. 4C depicts the VM repair subsystem 122 causing the instance 302 to shut down on the device of the set 114A, and migrating the instance 302 to a different host device of a different configuration (e.g., of the set 114B). FIG. 4D depicts detecting that the VM instance 302 has successfully stared on the host device of the different configuration, and again causing the instance 302 to hibernate. Thus, by the interactions of FIG. 4A-4D, the VM instance 302 may again be placed into a hibernated state, but be enabled to awaken on a higher-availability hardware configuration.

The interactions of FIG. 4A begin at (1), where the host configuration monitor 120 obtains from the VM metadata stores 124 metadata identifying instances 116 that are hibernated to logical disks provided by the system 130. The metadata illustratively includes information identifying the instance 116 (e.g., including a logical disk to which it is hibernated), and a configuration (e.g., a fingerprint) of a host device 114 on which the instance 116 was hibernated.

At (2), the host configuration monitor 120 detects that the availability of device 114 with a configuration compatible with a given hibernated instance 116 has fallen below a threshold level. As noted above, the threshold may be a fixed value, or may vary based, e.g., on a rate of change of compatible host devices 114 for an instance 116, a number of other instances 116 hibernated that require the same or similar host device 114 configurations, or the like. The threshold may be based on absolute availability of compatible host devices 114 (e.g., without respect to utilization rates of those devices), usable availability of host devices 114 (e.g., with respect to utilization rates of those devices), or a combination thereof. In one embodiment, the threshold is set by an operator of the hosted computing system 110. In another embodiment, the threshold is set by an end user of the instance 116 (e.g., via submission to a frontend 112). While the interactions of FIG. 4A-4D are discussed with respect to a single hibernated instance 116 (specifically, instance 302 of FIG. 3), similar interactions could be implemented for each such instance 116.

After detecting that the availability of device 114 with a configuration compatible with the instance 302 has fallen below a threshold level, the host configuration monitor 120 transmits a request to the VM repair subsystem 122 to "repair" the hibernation state of the instance 302 (where "repair" in the present context generally refers to a modification of the hibernation state to be compatible with a higher-availability configuration of host device 114).

The interactions of FIG. 4A are continued in FIG. 4B, where the VM repair subsystem 122, at (4), the identifies a host device 114 with a configuration compatible with the hibernated instance 302—specifically, a host device of the set 114A (hereinafter referred to as host device 114A for simplicity). Illustratively, the VM repair subsystem 122 may identify the device of set 114A by comparing a fingerprint of the device 114A with a fingerprint associated with the hibernated instance 302, to determine that such fingerprints match or are compatible with one another. After identifying the host device 114A, the VM repair subsystem 122 then, at (5), instructs the host device 114A to awaken the VM instance 302. In the present context, awakening the VM instance 302 may include the host device 114A at (6), recreating the configuration of the VM instance 302 on the host device, which configuration may be stored, for example, in the VM metadata stores 124. Illustratively, recreating the configuration of the instance 302 includes linking or "attaching" the VM logical disk 306, storing the VM instance hibernation data 308, to the instance 302. After recreating the configuration of the instance 302 on the host device 114A, the host device 114A then, at (7), causes the VM instance 302 to awaken from hibernation. Illustratively, causing the VM instance 302 to awaken may include powering on the instance 302, which may cause the instance 302 to detect the VM instance hibernation data 308 within the logical disk 306 and to resume the state recorded in that data 308. As the host device 114A was selected by the VM repair subsystem 122 for compatibility with the hibernated state of the instance 302, it is expected that awakening from hibernation would generally proceed without error.

In accordance with traditional hibernation techniques, the VM instance 302 may utilize, during awakening, the hibernation data 308. The instance 302 may therefore retrieve the data 308 from the logical disk 306, and in the process, delete the data 308. Thus, FIG. 4B depicts the hibernation data 308 as transitioning to deleted hibernation data 310.

At (9), the host computing device 114A detects that the VM instance has awoken successfully. In one embodiment, the host device 114A can detect a successful wake by direct inspection of the state of the instance 302 (e.g., via a hypervisor). In another embodiment, the host device 114A detects a successful wake via network communications with the instance 302. For example, the device 114A (or another device of the system 110) may transmit a "health check" request to the instance 302, which health check request may be a network packet expected to result in a predict response when the instance 302 is in a healthy and initialized state. In one embodiment, the health check is an Internet Control Message Protocol (ICMP) "ping" message. In another embodiment, the health check message and associated response are designated by an end user of the instance 302 (e.g., during initial configuration of the instance 302). The host device 114A notifies the VM repair subsystem 122 of the successful wake at (10).

The interactions of FIG. 4B are continued in FIG. 4C, where the VM repair subsystem 122, after receiving notification of successful wake of the VM instance 302 on the device 114, instructs the host computing device 114A to shut down the instance 302, at (11). The host device 114A, in turn, shuts down the instance 302, such as by transmitting to the instance 302 an ACPI shutdown signal, at (12). The host device 114A then notifies the VM repair subsystem 122 of the successful shutdown, at (13).

As the instance 302 is then in a shutdown state, it is expected to be more resilient to a change in underlying configuration of a host device 114 than it would otherwise be in a hibernated state. Accordingly, the instance 302 can be migrated to a host device 114 of a different configuration, such as a host device 114 of the set 114B (referred to hereinafter as host computing device 114B for simplicity). For the purposes of illustration, the host device 114B is assumed to be of a higher-availability configuration than the device 114A. In some instances, the VM repair subsystem 122 may identify the device 114B based on the availability of its configuration (e.g., as a most available configuration).

The VM repair subsystem 122 thus, at (14), instructs the host computing device 114B to generate and start the VM instance 302. The device 114B, in turn, generates the VM instance 302 on the host device 114B. In one embodiment, the device 114B generating the instance 302 includes copying a configuration of the instance 302 from host device 114A. In another embodiment, generating the instance 302 includes recreating a configuration of the instance 302 on the device 114B from other information, such as information the VM instance metadata 304. In either instance, the VM instance 302 is effectively migrated from the device 114A (from which it may be removed) to the device 114B, as shown by the dashed line of FIG. 4C. As the instance 302 is in a shutdown start, little data transfer is required to migrate the instance 302 (e.g., only configuration data). As noted above, configuring the instance 302 can generally include linking the instance to the VM logical disk 306, holding data such as an operating system of the instance 302 and any applications of the instance 302.

After generating the instance 302, the device 114B instructs the instance 302 to start, such as by sending an ACPI power on command to the instance 302. The instance 302 can thus be expected to begin initialization, such as loading any applications configured to load on startup, running any start scripts, and the like.

The interactions of FIG. 4C are continued in FIG. 4D, where the host computing device 114B detects that the instance 302 has successfully started, at (17). Detection of a successful start may be implemented similarly to detection of successful wake, as discussed above. For example, detection of successful start may include submitting health check data to the instance 302 and verifying that a response to the health check data is as expected. The device 114B then notifies the VM repair subsystem 122 of the successful start, at (18). As the instance 302 is thus expected to be in an initialized state, the instance 302 can once again be hibernated. As such, the VM repair subsystem 122, at (19), submits a hibernation request to the frontend 112. The frontend 112 may handle the hibernation request in a manner similar to such requests from client devices 102. As such, interactions (20)-(24) of FIG. 4D may be substantially similar to interactions (2)-(6) of FIG. 3. For this reason, these interactions will be not redescribed in detail. However, in contrast to interactions (2)-(6) of FIG. 3, because the instance 302 in FIG. 4D is hibernated on the device 114B, the VM instance hibernation data 310 generated for this hibernation is expected to be compatible with the high-availability configuration of the device 114B. Thus, even if all devices of the set 114A are removed from the system 110 (e.g., all devices compatible with the hibernation data 308 created when a client last instructed the instance 302 to hibernate), the client may nonetheless be enabled to awaken the instance 302 from hibernation.

While illustrative interactions are depicted in FIGS. 4A-4D, variations on such interactions are contemplated. For example, instances 302 may be configured to take actions over a network at various times during operation (e.g., at awakening, at powering on, etc.), which may be undesirable during the interactions of FIG. 4A-4D (as the end user is not activating the instance for its intended purpose during these interactions). As such, in one embodiment, the interactions of FIG. 4A-4D may be modified such that the instance 302, during those interactions is "network isolated." Illustratively, devices 114 when configuring the instance 302 may block all network traffic to the instance 302, or may allow only network traffic to or from a specific endpoint (e.g., an endpoint configured to send health check data to the instance). In one embodiment, network traffic may be restricted by a host device 114, such as by implementing a firewall on the host device 114 to allow (or "whitelist") health check traffic, or to block (or "blacklist") other traffic. In another embodiment, network traffic may be restricted by a network configuration of the hosted computing system 110. For example, the hosted computing system 110 may be configured to interconnect VM instances 116 via virtualized networks. In one embodiment, traffic to the instance 302 may be restricted by configuring the instance 302 within a virtualized network that includes, for example, health check devices, but excludes other devices.

As another example variation on the interactions discussed above, if the interactions of FIGS. 4A-4D are deemed to have some risk of negative impact on the instance 302 (e.g., due to potential errors on startup or the like), the interactions of FIG. 4A-4D may be modified to include one or more backup operations for the instance 302. For example, each device 114 hosting the instance 302 may be configured to take a "snapshot" of the instance 302 prior to starting or awakening the instance. Thus, should an error occur, the instance may be rolled back to that snapshotted state. In yet another embodiment, the interactions of FIG. 4A-4D may occur not with respect to the primary logical disk of an instance, but with respect to a "clone" of that disk. Should the interactions succeed, the primary disk may be removed, and the clone instated as a new primary disk. Should the interactions not succeed, the clone may be deleted and the operations may be attempted again. Thus, the interactions of FIG. 4A-4D are intended as illustrative.

Figure 5:
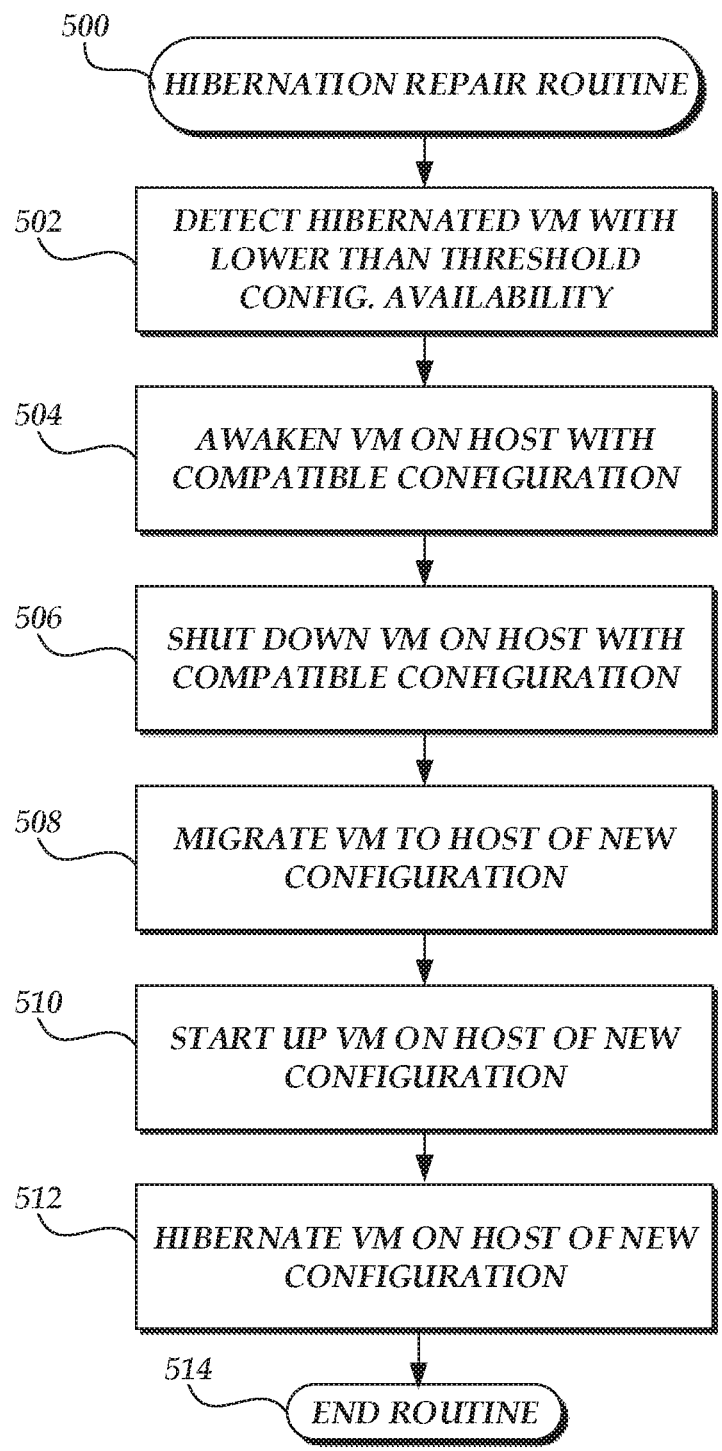
FIG. 5 is a flow chart depicting an illustrative routine for repairing a virtual machine instance incompatible with a configuration of a set of host devices.

With reference to FIG. 5, an illustrative routine 500 is depicted for "repairing" a hibernation state of an instance 116, such that the instance 116 can resume on a host device 114 configuration other than the device 114 on which the hibernation occurred. The routine 500 may be carried out, for example, by a hosted computing system (e.g., the system 110 of FIG. 1).

The routine 500 begins at block 502, where the system 110 (e.g., via a host configuration monitor 120) detects that a hibernated VM instance 116 exists (e.g., as data within the data storage service 130) that is compatible with the configuration of less than a threshold number of host devices 114. Illustratively, the system 110 may detect a fingerprint of a host device 114 on which the instance 116 was hibernated, and detect that host devices 114 of that fingerprint, or of a fingerprint compatible with that fingerprint, have fallen below a threshold level. As noted above, the threshold level may be specified, for example, by an administrator of the system 110, by a user of the instance 116, or the like. The threshold may be a fixed number (e.g., a set number of absolutely available or currently available host devices 114) or a dynamic number, such as based on a rate of decrease in such host devices 114.

At block 504, the system 110 awakens the VM instance 116 on a host device 114 matching (e.g., compatible with) the hibernation state of the instance 116. The compatible host device 114 may, for example, have a fingerprint identical to that of a device 114 on which the hibernation state was created, or have a fingerprint known to be compatible with the device 114 on which the hibernation state was created. Awakening the VM instance 116 may include, for example, recreating a configuration of the instance 116 on the host device 114, attaching a logical disk including the hibernation state data to the recreated the instance 116 on the host device 114, and starting the recreated instance 116. Awakening the VM instance 116 may further include waiting until the instance 116 is known to have awakened, such as by waiting until health check data transmitted to the instance 116 by the system 110 returns an expected response. As noted above, in some embodiments, awakening the instance 116 may include limiting network communications of the instance 116, such as by blocking network traffic to and from the instance 116 (e.g., other than health check-related data).

At block 506, the system 110 shuts down the VM instance on the host device 114 compatible with the initial hibernation state of the instance 116. Shutting down the instance may include, for example, sending an ACPI shutdown signal to the instance 116, and awaiting completion of the shutdown.

As discussed above, instances 116 in a shutdown state are generally less susceptible (when compared to instances 116 in a hibernated state) to errors when resuming operation. Thus, at block 508, the system 110 migrates the VM instance 116 to a host device 114 of a new configuration, such as a more highly-available configuration on the system 110. As discussed above, migration of the instance 116 may require little transfer of data, as the majority of information used by the instance can be stored within a logical disk attachable to a number of host devices 114 over a network. Thus, migration at block 508 can generally include recreation of the configuration of the instance 116 on a new host device 114, either by transfer of the configuration from the prior host device 114 (e.g., of the prior configuration compatible with the initial hibernation state), or transfer of the configuration from another data source (e.g., metadata stores 124 on the system 130), as well as attaching logical storage of the instance 116 to the instance 116 as it exists on the new host device 114.

At block 510, the system 110 causes the instance 116 to power on at the new host device 114. Powering on the instance 116 can include, for example, loading any applications or executing any scripts that the instance 116 is configured to load or execute at startup. In one embodiment, implementation of block 510 includes transmitting health check data to the instance 116 and verifying that the data elicits an expected response.

At block 512, the system 110 causes the instance 116 on the host device 114 of the new configuration to hibernate. In accordance with traditional hibernation, causing the instance 116 to hibernate generally causes the instance 116 to generate hibernation state data on its logical disk, thus enabling the instance 116 to be removed from the host device 114 and to be resumed on another host device 114 of compatible configuration at a later time. However, because the host device 114 was selected by the system 110 as having a more highly-available configuration than the host device 114 of the prior configuration, it is expected that the state data generated at block 512 will be associated with a reduced chance of error when a client attempts to awaken the instance 116 on the system 110. Thus, by implementation of the routine 500, a VM instance 116 hibernated on a host device 114 corresponding to a low-availability configuration may be enabled to awaken from hibernation on a host device 114 of a higher-availability configuration.

As noted above, the routine 500 may be implemented by a hosted computing system. In one embodiment, the routine 500 is implemented periodically by the system, such as once per hour, day, week, etc. In another embodiment, the routine 500 is implemented in response to detecting an availability of a host device configuration (e.g., a configuration known to be associated with a hibernated instance) falling below a threshold level. In some instances, the routine 500 may include explicit delays between blocks. For example, after detecting a hibernated instance with a compatible configuration availability lower than a threshold level during implementation of block 502, the system may delay implementation of block 504 if the configuration availability is expected to rise. For example, the system may maintain historical records of a configuration availability, which records indicate a periodicity of availability (e.g., falling during peak usage hours, rising during off-peak hours). If block 502 is implemented during a relatively high point in the periodicity, the system may delay implementation of block 504 until an expected low point in the periodicity, in order to minimally impact the compatible configuration availability due to implementation of the routine 500. Thus, the timing and implementation of the routine 500 may vary across embodiments.

While a general overview of hibernation on a hosted computing system is provided herein, the specific processes used to initiate a given hibernation on a hosted computing system may vary according to the configuration of that system. Additional details regarding one potential implementation of hibernation in on a hosted computing system are provided within U.S. patent application Ser. No. 15/587,355, entitled "User and System Initiated Instance Hibernation" and filed May 4, 2017, the entirety of which is hereby incorporated by reference.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system to manage virtual machine hibernation state incompatibility with underlying host configurations, the system comprising:
one or more data stores including hibernation state data of a virtual machine instance and metadata identifying a first host device configuration, the first host device configuration representing a configuration of a host device hosting the virtual machine instance at a time that the hibernation state data was generated, wherein the hibernation state data is compatible with host devices matching the first host device configuration and incompatible with host devices matching a second host device configuration;
a processor configured with computer-executable instructions to:
determine that an availability of the host devices matching the first host device configuration has fallen below a threshold level;
awaken the virtual machine instance on a first host device from the host devices matching the first host device configuration;
verify that the virtual machine instance has awakened on the first host device;
shut down the virtual machine instance on the first host device;
migrate the virtual machine instance to a second host device, the second host device selected from the host devices matching the second host device configuration;
boot the virtual machine instance on the second host device;
verify that the virtual machine instance is in an initialized state on the second host device; and
hibernate the virtual machine instance on the second host device, wherein the virtual machine instance is configured, on hibernating, to store, within the one or more data stores, new hibernation state data that is compatible with host devices matching the second host device configuration.

2. The system of claim 1, wherein at least one of the one or more data stores is included within a data storage system configured to present at least a portion of the at least one data store to the virtual machine instance as a logical disk of the virtual machine instance.

3. The system of claim 2, wherein the processor, to awaken the virtual machine instance on the first host device, is configured to:
cause the first host device to recreate the virtual machine instance from data identifying a configuration of the virtual machine instance, the configuration of the virtual machine instance linking the virtual machine instance to the logical disk; and
boot the virtual machine instance, wherein booting the virtual machine instance causes the virtual machine instance to utilize the hibernation state data to resume operation of the virtual machine instance from a state indicated within the hibernation state data.

4. The system of claim 1, wherein to hibernate the virtual machine instance on the second host device, the processor is configured to cause an Advanced Configuration and Power Interface (ACPI) hibernate signal to be transmitted to the virtual machine instance on the second host device.

5. A computer-implemented method comprising:
identifying one or more data stores including hibernation state data of a virtual machine instance and metadata identifying a first host device configuration, the first host device configuration representing a configuration of a host device hosting the virtual machine instance at a time that the hibernation state data was generated, wherein the hibernation state data is compatible with host devices matching the first host device configuration and incompatible with host devices matching a second host device configuration;
determining that an availability of the host devices matching the first host device configuration has fallen below a threshold level;
awakening the virtual machine instance on a first host device from the host devices matching the first host device configuration;
shutting down the virtual machine instance on the first host device;
migrating the virtual machine instance to a second host device, the second host device matching the second host device configuration;
booting the virtual machine instance on the second host device; and
hibernating the virtual machine instance on the second host device, wherein the virtual machine instance is configured, on hibernating, to store within the one or more data stores new hibernation state data that is compatible with host devices matching the second host device configuration.

6. The computer-implemented method of claim 5, wherein awakening the virtual machine instance on the first host device comprises verifying that the virtual machine instance has awakened on the first host device.

7. The computer-implemented method of claim 6, wherein verifying that the virtual machine instance has awakened on the first host device comprises transmitting health check data to the virtual machine instance on the first host device and verifying that the health check data elicits an expected response from the virtual machine instance.

8. The computer-implemented method of claim 5, wherein the threshold level is a fixed value.

9. The computer-implemented method of claim 5, wherein the threshold level is a dynamic value based at least partly on a rate of change of the availability of the host devices matching the first host device configuration.

10. The computer-implemented method of claim 5, wherein the data store comprises a plurality of data stores, and wherein the threshold level is a dynamic value based at least partly on a number of other virtual machine instances associated with hibernation state data in the plurality of data stores that is compatible with host devices matching the first host device configuration.

11. The computer-implemented method of claim 5, wherein the threshold level is set by an end user of the virtual machine instance.

12. The computer-implemented method of claim 5, wherein migrating the virtual machine instance to a second host device comprises recreating the virtual machine instance on the second host device independent of reading data from the first host device.

13. The computer-implemented method of claim 5, wherein awakening the virtual machine instance on the first host device comprises limiting network traffic transmitted from the virtual machine instance.

14. The computer-implemented method of claim 13, wherein limiting network traffic transmitted from the virtual machine instance comprises allowing health check response data to be transmitted from the virtual machine instance and disallowing other traffic.

15. The computer-implemented method of claim 13, wherein limiting network traffic transmitted from the virtual machine instance comprises modifying a firewall external to the virtual machine instance to limit the network traffic.

16. The computer-implemented method of claim 13, wherein limiting network traffic transmitted from the virtual machine instance comprises modifying a configuration of a virtualized network to which the virtual machine instance is connected.

17. Non-transitory computer-readable media comprising computer-executable instructions executable by a computing system comprising at least one data store including hibernation state data of a virtual machine instance and metadata identifying a first host device configuration, the first host device configuration representing a configuration of a host device hosting the virtual machine instance at a time that the hibernation state data was generated, the hibernation state data being compatible with host devices matching the first host device configuration and incompatible with host devices matching a second host device configuration, wherein the instructions, when executed by the computing system, cause the computing system to:
determine that an availability of the host devices matching the first host device configuration has fallen below a threshold level;
instruct the virtual machine instance to awaken on a first host device from the host devices matching the first host device configuration;
instruct the virtual machine instance to shut down on the first host device;
cause the virtual machine instance to migrate to a second host device, the second host device matching the second host device configuration;
instruct the virtual machine instance to boot on the second host device; and
instruct the virtual machine instance to hibernate on the second host device, wherein the virtual machine instance is configured, on hibernating, to store within the at least one data store new hibernation state data that is compatible with host devices matching the second host device configuration.

18. The non-transitory computer-readable media of claim 17, wherein the availability of the host devices matching the first host device configuration reflects a number of host devices matching the first host device configuration on a hosted computing system.

19. The non-transitory computer-readable media of claim 17, wherein the availability of the host devices matching the first host device configuration reflects a current resource availability of host devices matching the first host device configuration on a hosted computing system.

20. The non-transitory computer-readable media of claim 17, wherein the instructions cause the computing system to migrate the virtual machine instance at least partly by copying a configuration of the virtual machine instance from the first host device to the second host device.

21. The non-transitory computer-readable media of claim 17, wherein the instructions further cause the computing system to select the second host device based at least in part on an availability of host devices matching the second host device configuration.

22. The non-transitory computer-readable media of claim 17, wherein the host devices matching the first host device configuration include host devices with configurations determined to be compatible with the first host device configuration.

* * * * *